US012082677B2

(12) United States Patent
Chevalier

(10) Patent No.: US 12,082,677 B2
(45) Date of Patent: Sep. 10, 2024

(54) DEVICE FOR DISPENSING A LIQUID OR PASTY PRODUCT

(71) Applicant: LVMH Recherche, Saint-Jean-de-Braye (FR)

(72) Inventor: Marc Chevalier, Franconville (FR)

(73) Assignee: LVMH Recherche, Saint Jean de Braye (FR)

( * ) Notice: Subject to any disclaimer, the term of this patent is extended or adjusted under 35 U.S.C. 154(b) by 309 days.

(21) Appl. No.: 17/773,948

(22) PCT Filed: Nov. 23, 2020

(86) PCT No.: PCT/FR2020/052152
§ 371 (c)(1),
(2) Date: May 3, 2022

(87) PCT Pub. No.: WO2021/105601
PCT Pub. Date: Jun. 3, 2021

(65) Prior Publication Data
US 2022/0395075 A1 Dec. 15, 2022

(30) Foreign Application Priority Data
Nov. 26, 2019 (FR) ........................................ 1913231

(51) Int. Cl.
*A45D 34/04* (2006.01)
*A45D 34/02* (2006.01)
*B05B 11/00* (2023.01)

(52) U.S. Cl.
CPC ............. *A45D 34/04* (2013.01); *A45D 34/02* (2013.01); *B05B 11/0056* (2013.01); *A45D 2200/057* (2013.01)

(58) Field of Classification Search
CPC ..... A45D 34/02; A45D 34/04; B05B 11/0056
See application file for complete search history.

(56) References Cited

U.S. PATENT DOCUMENTS

2011/0297275 A1* 12/2011 Farrar ................ B65D 83/0055 141/113
2013/0019991 A1* 1/2013 Muller ................ B05B 11/0056 222/321.9
2017/0100733 A1* 4/2017 Okhai .................. B67D 7/0205

FOREIGN PATENT DOCUMENTS

EP 1588775 A1 10/2005
EP 1744955 A2 1/2007
(Continued)

OTHER PUBLICATIONS

English Translation of International Search Report, pertinent pp. 7 and 8. Dated Feb. 24, 2021 (Year: 2021).*
(Continued)

*Primary Examiner* — J C Jacyna
(74) *Attorney, Agent, or Firm* — Lippes Mathias LLP

(57) ABSTRACT

A dispensing device for dispensing a liquid or pasty product, in particular a cosmetic product, including a daughter bottle, a mother bottle and a refill mechanism. The daughter bottle is equipped with a dispensing member and a daughter portion of the refill mechanism. The mother bottle is equipped with a mother portion of the refill mechanism and defines a recess for removably receiving the daughter bottle. The daughter portion is configured to couple to the mother portion when the daughter bottle is received in the recess. The refill mechanism is then able to refill the daughter bottle with product from the mother bottle. The dispensing device transmits an actuation force of the dispensing member in order to actuate the refill mechanism. The force required for actuating the dispensing member is greater than or equal to the force required for actuating the refill mechanism.

12 Claims, 2 Drawing Sheets

(56) References Cited

FOREIGN PATENT DOCUMENTS

| | | | |
|---|---|---|---|
| FR | 3064927 | A1 | 10/2018 |
| GB | 2534985 | A | 8/2016 |
| WO | WO 2015181717 | A2 | 12/2015 |
| WO | WO 2016014256 | A1 | 1/2016 |

OTHER PUBLICATIONS

French Search Report of French Application Serial No. 1913231 dated Jul. 23, 2020, 2 pages.
International Search Report of International Application Serial No. PCT/FR2020/052152 dated Feb. 24, 2021 and English translation, 5 pages.

* cited by examiner

DEVICE FOR DISPENSING A LIQUID OR PASTY PRODUCT

BACKGROUND OF THE DISCLOSURE

The present disclosure relates to a device for dispensing a liquid or pasty product, and more particularly a dispensing device comprising a mother bottle and a daughter bottle that can be refilled from the mother bottle. Such a device can be used, in particular, for dispensing a cosmetic product, for care or perfumery, in particular perfume.

STATE OF THE ART

Users of cosmetic products are increasingly requesting small volume packaging, whether to take up less space in their belongings when travelling or in order to comply with new regulations imposing maximum volumes for air travel.

Patent EP 1 744 955 B1 thus describes a relatively small bottle that it is possible to refill by coupling it to a larger bottle. In order to do this, the large bottle spray head is removed to reveal the pump rod of the large bottle dispensing mechanism. The pump rod is introduced into an opening of the small bottle and pushed towards the small bottle so as to trigger the passage of liquid from the large bottle to the small bottle.

However, such a device has several disadvantages: the use of the large bottle is impractical because it requires the spray head to be frequently removed or replaced, depending on whether it is desired to use the large bottle on its own or as a refill for the small bottle. In addition, the aesthetics and stability of the assembly during refilling can be improved.

There is therefore a need for a novel type of dispensing device.

SUMMARY OF THE DISCLOSURE

For this purpose, the present disclosure relates to a dispensing device for dispensing a liquid or pasty product, in particular a cosmetic product, comprising a daughter bottle, a mother bottle and a refill mechanism, in which the daughter bottle is equipped with a dispensing member and a daughter portion of the refill mechanism, the mother bottle is equipped with a mother portion of the refill mechanism and defines a recess for removably receiving the daughter bottle, said daughter portion being configured to couple to said mother portion when the daughter bottle is received in the recess, the refill mechanism then being able to refill the daughter bottle with product from the mother bottle, the dispensing device being configured to transmit an actuation force of the dispensing member in order to actuate the refill mechanism, the force required for actuating the dispensing member being greater than or equal to the force required for actuating the refill mechanism.

Within the meaning of the present disclosure, a cosmetic product may be, in the broad sense, a product intended to produce a visual effect on a person, but also a perfumery or care product. A liquid or pasty product means a formula that is sufficiently fluid to be dispensed by the dispensing member.

Within the meaning of the present disclosure, a bottle is a container of any shape, capable of containing said product in a sealed manner with the exception of the intentional openings provided.

The mother bottle may be larger than the daughter bottle. The daughter bottle may be partially or totally received in the recess, in other words at least 30% of the volume of the daughter bottle is located inside the recess, preferably at least 40%, preferably at least 50%, preferably at least 60%, preferably at least 70%, preferably at least 80%, preferably at least 90%, preferably all the daughter bottle, optionally with the exception of its dispensing member.

Besides, the capacity of the mother bottle, in other words the volume of product that the bottle can contain, may be greater than or equal to the capacity of the daughter bottle.

When they are coupled to one another, the mother bottle and the daughter bottle together define a refill mechanism, of which a mother portion is provided on the mother bottle and a daughter portion is provided on the daughter bottle. The refill mechanism is configured to transfer the product from the mother bottle to the daughter bottle. The coupling between the daughter portion and the mother portion of the refill mechanism is removable, so that after refilling the daughter bottle, the daughter bottle can be withdrawn from the recess and then transported away from the mother bottle.

The dispensing member of the daughter bottle is configured to dispense the product coming from the daughter bottle under the effect of an actuating force. The dispensing member can be a pump or valve type dispensing member, for example. In these examples, the product passes through the dispensing member during dispensing.

As previously indicated, when the daughter bottle is received in the recess of the mother bottle and the daughter portion of the refill mechanism is coupled to the mother portion of said mechanism, an actuating force of the dispensing member of the daughter bottle is transmitted to the refill mechanism and actuates the refill mechanism. Due to the fact that the force required for actuating the dispensing member is greater than or equal to the force required for actuating the refill mechanism, during actuation of the dispensing member, the force is transmitted to the refill mechanism and actuates the refill mechanism before being sufficient to actuate the dispensing member, or simultaneously. Hence, the refill mechanism is actuated before or at the same time as the dispensing member, which guarantees the refill of the daughter bottle with product when dispensing of product from the daughter bottle is carried out. For the user, these two actions are performed in a single gesture and everything occurs as if the dispensing member of the daughter bottle allowed dispensing of the product coming from the mother bottle.

Consequently, the present dispensing device enables the product from the mother bottle to be consumed when the daughter bottle is received in the recess and the mother and daughter portions of the refill mechanism are coupled to one another. Hence, a separate dispensing head is not useful for the mother bottle, which makes its use more ergonomic. The recess also ensures a stable and aesthetic coupling between the mother bottle and the daughter bottle.

In some embodiments, the dispensing member is configured to deliver the product from the daughter bottle under the action of a pressure from a user. Hence, the dispensing member is easy to use. The pressure may be an axial pressure exerted in the longitudinal direction of the daughter bottle. The user may exert the pressure directly on the dispensing member, so that the dispensing device can be devoid of any mechanical transmission member.

In some embodiments, when the daughter bottle is received in the recess, the refill mechanism is designed to actuate in response to the movement of the daughter bottle in the recess under the effect of said pressure.

Hence, in these embodiments, the pressure exerted by the user first sets in motion the daughter bottle in the recess, which actuates the refill mechanism and then, when the pressure becomes sufficient, for example at the end of the stroke of the refill mechanism, the pressure exerted by the user actuates the dispensing member.

In these embodiments, a given pressure conjointly allows the actuating of the dispensing member (delivery of product from the daughter bottle) and the actuation of the refill mechanism (refilling of the daughter bottle from the mother bottle).

In some embodiments, the mother portion of the refill mechanism comprises a pump, the outlet of which is configured to engage in an orifice of the daughter portion of the refill mechanism. In particular, the outlet of the pump may have the form of a rod.

In some embodiments, the dispensing device comprises sealing means provided between the mother portion and the daughter portion of the refill mechanism. The sealing means, such as a flat, annular or O-ring seal or a tight coupling between the mother portion and the daughter portion, etc., may be supported by the mother portion and/or by the daughter portion.

In some embodiments, when the daughter bottle is received in the recess, a wall of the daughter bottle bears on an actuating portion of the refill mechanism. In particular, said actuating portion may be provided in the mother portion of the refill mechanism. Hence, the refill mechanism may be actuated by a movement of the daughter bottle, or more generally said wall, said wall then bearing on the actuating portion.

In some embodiments, the daughter portion of the refill mechanism comprises a sealing valve such as a non-return valve. Hence, the product does not leak through the opening provided in the daughter part of the refill mechanism.

In some embodiments, the sealing valve is configured to open under pressure of the product coming from the mother bottle. The sealing valve may be configured to remain closed when the pressure of the product coming from the mother bottle is less than a predetermined threshold.

In some embodiments, the refill mechanism and the dispensing member are dimensioned so that the volume of product injected into the daughter bottle by the refill mechanism in one actuation is less than, or preferably equal to, the volume of product dispensed by the dispensing member in one actuation. In quantitative considerations, actuation is one complete stroke of the refill mechanism or the dispensing member. Hence, the above-mentioned volumes are the maximum volumes that the refill mechanism and the actuating member can deliver.

These features avoid the situation in which the volume of product injected into the daughter bottle by the refill mechanism generates an overpressure in the daughter bottle. When the volumes are equal, the product refilled from the mother bottle aims to replace a same volume of the product simultaneously consumed due to the dispensing member. Hence, the refilling of the daughter bottle is particularly efficient.

In some embodiments, the daughter portion of the refill mechanism is provided, on the daughter bottle, opposite the dispensing member. Typically, on a bottle extending in a longitudinal direction, for example from low to high, the daughter portion of the refill mechanism may be provided at the lower end whilst the dispensing member may be provided at the upper end. The daughter portion of the refill mechanism can therefore be easily hidden from the user and coupled to the mother portion, while the dispensing member remains easily accessible to the user.

In some embodiments, the daughter bottle comprises a reservoir for receiving the product, said reservoir being non-deformable. Hence, the volume receiving the product, in other words the capacity of the reservoir, is constant during dispensing and refilling, unlike a deformable pouch or a piston reservoir.

In some embodiments, the mother bottle comprises a cover around the refill mechanism. The cover may mask the refill device and/or the inside of the recess from view from outside the mother bottle. The cover may be opaque or translucent.

In some embodiments, the daughter bottle comprises a reservoir intended to receive the product, the wall of the reservoir having at least one transparent or translucent window. Thus, it is easy to estimate the quantity of product remaining in the reservoir. The wall of the reservoir may comprise a plurality of delimited windows, or may even entirely form a window, for example by being entirely transparent or translucent.

In some embodiments, the mother bottle comprises centring means mounted in the recess. The centring means, for example sheath, ring, protrusion, or fool-proofing type centring means, etc., further stabilise the daughter bottle in the recess in order to make the coupling more reliable between the daughter portion and the mother portion of the refill mechanism.

In some embodiments, the reservoir of the daughter bottle has, in its lower portion, a locally reduced cross-sectional area. The lower portion may be, as previously disclosed, the portion opposite the dispensing member. The cross-sectional area is the area measured transversely to the above-mentioned longitudinal direction. Through these measures, the quantity of inaccessible product at the bottom of the reservoir is reduced.

In some embodiments, the mother bottle does not have a separate actuator from the daughter bottle; in particular, the mother bottle may not have a dispensing head. In the strict sense, the mother bottle may comprise its own dispensing member, integrated with the mother portion of the refill mechanism, and itself have an internal actuator but, in normal use, in these embodiments, the user cannot use this internal actuator without using the daughter bottle. Hence, the use of the daughter bottle is essential to the operation of the mother bottle, the mother bottle being unusable without the daughter bottle.

The present disclosure also relates to a method for distributing a liquid or pasty product, in particular cosmetic product, comprising:

- supplying a dispensing device comprising a daughter bottle, a mother bottle and a refill mechanism, wherein the daughter bottle is equipped with a dispensing member and a daughter portion of the refill mechanism, and the mother bottle is equipped with a mother portion of the refill mechanism;
- introducing the daughter bottle into a recess of the mother bottle so as to couple said daughter portion to said mother portion, the refill mechanism then being able to refill the daughter bottle with product from the mother bottle;
- actuating the refill mechanism and the dispensing member by a same actuating force applied to the dispensing member and transmitted to the refill mechanism.

This method may employ a dispensing device having all or some of the previously disclosed features. By applying a single actuating force, the user actuates both the refill mechanism and the dispensing member, which allows the product coming from the daughter bottle to be dispensed and to conjointly refill the daughter bottle from the mother bottle.

The present disclosure also relates to a method for refilling a daughter bottle with a liquid or pasty product, in particular with cosmetic product, wherein the daughter bottle is equipped with a dispensing member and a daughter portion of a refill mechanism, the refilling method comprising:

- introducing the daughter bottle into a recess of a mother bottle equipped with a mother portion of the refill mechanism, so as to couple said daughter portion to said mother portion, the refill mechanism then being suitable for refilling the daughter bottle with product from the mother bottle;
- actuating the refill mechanism by an actuating force applied to a portion of the daughter bottle different from the dispensing member.

The refilling method can employ a dispensing device having all or some of the previously disclosed features. Through such a method, a user can easily refill the daughter bottle after a mobile use of the daughter bottle independently of the mother bottle.

In some embodiments, the actuating force is applied to a cap of the daughter bottle.

BRIEF DESCRIPTION OF THE DRAWINGS

Other features and advantages of the subject matter of the present invention will emerge from the following description of embodiments, provided by way of non-limiting examples, with reference to the accompanying figures.

DETAILED DESCRIPTION OF THE PREFERRED EMBODIMENTS

Figure 1:
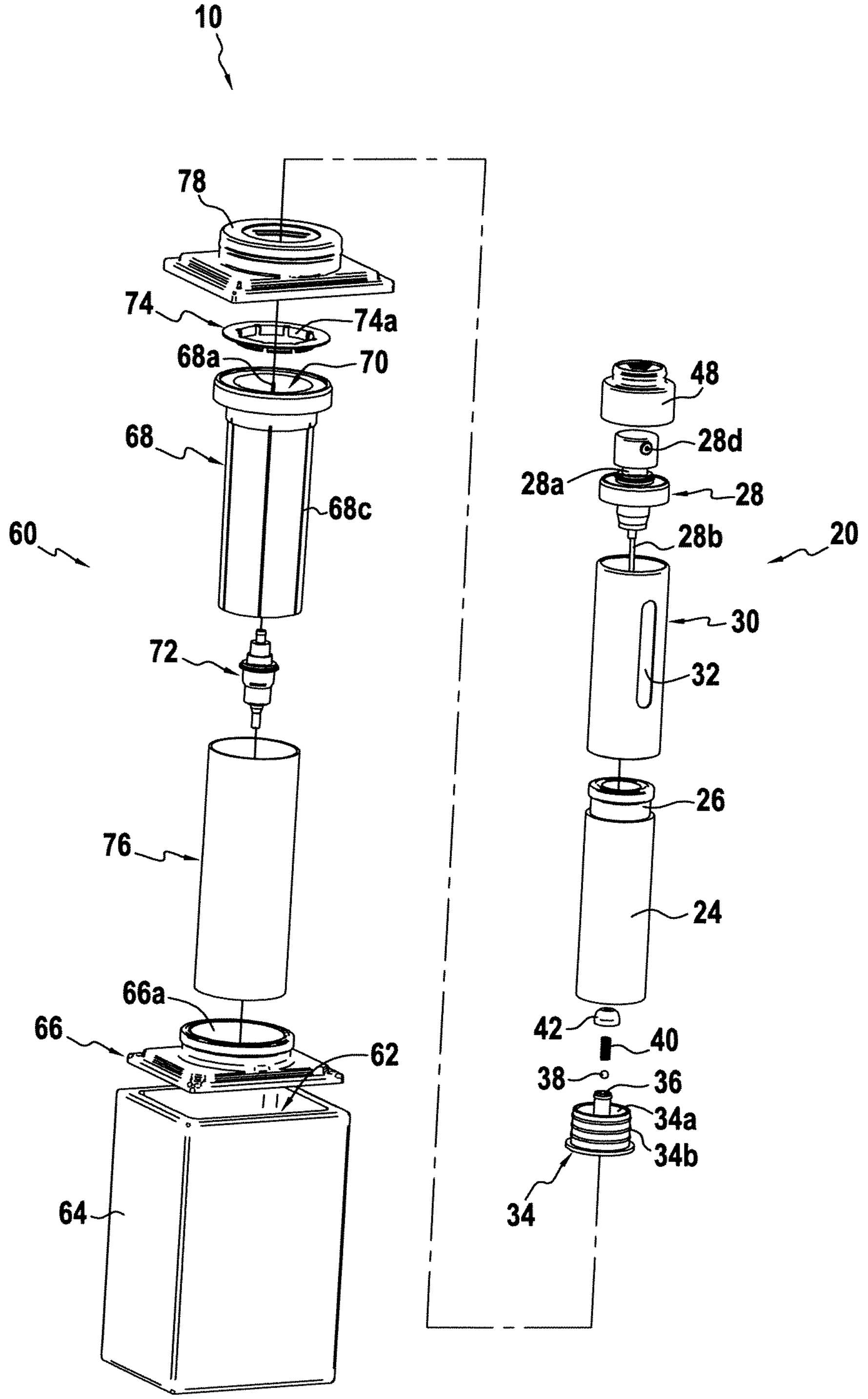
FIG. 1 is an exploded perspective view of a dispensing device according to a preferred embodiment of the disclosure.
Figure 2:
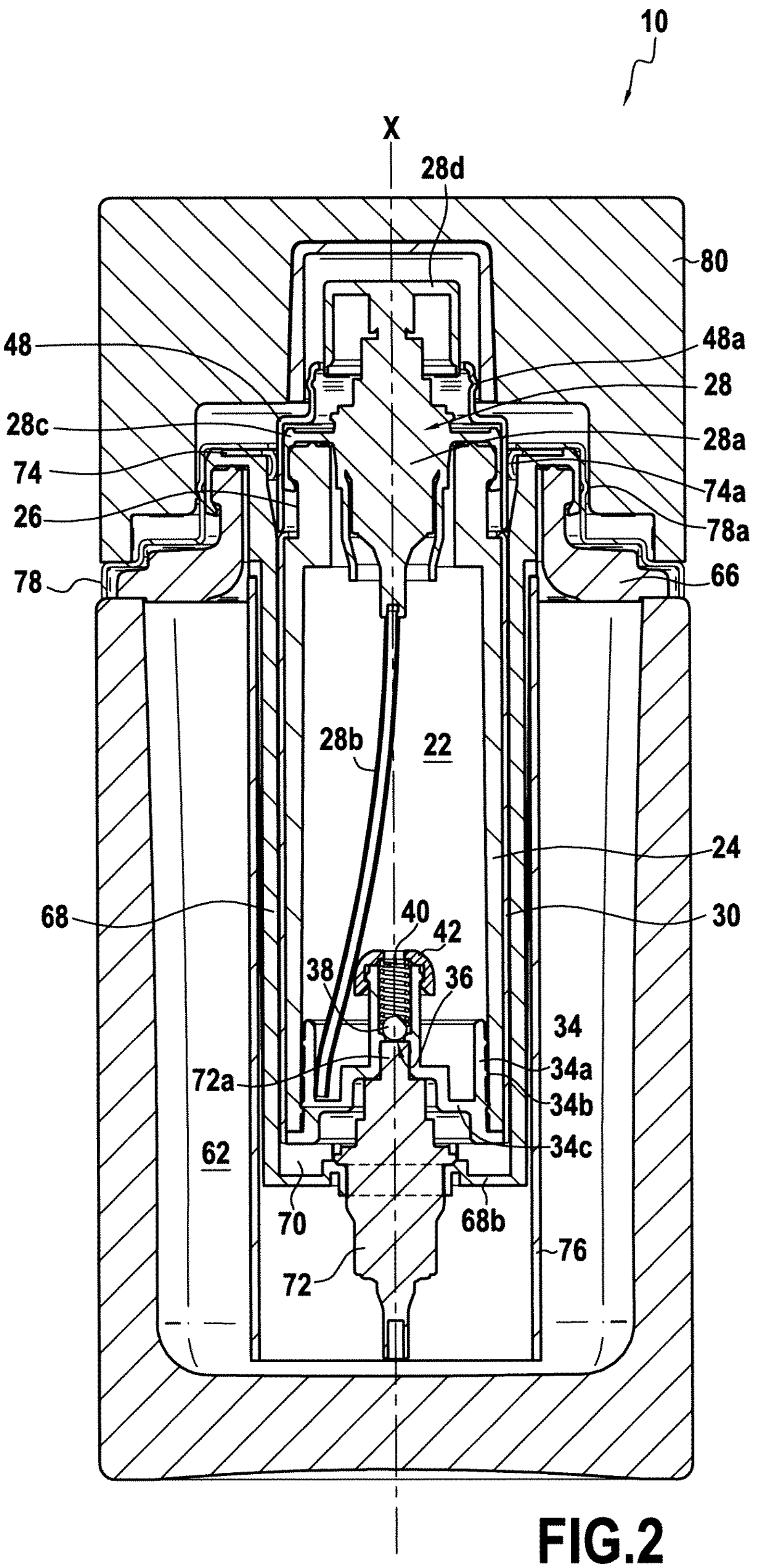
FIG. 2 is a longitudinal sectional view of a dispensing device according to the embodiment shown in FIG. 1.

A dispensing device according to an embodiment will be presented with reference to FIGS. 1 and 2. The dispensing device 10 comprises a daughter bottle 20 and a mother bottle 60.

The daughter bottle 20 comprises a reservoir 22 (see FIG. 2) intended to receive a liquid or pasty product, in particular a cosmetic product, for perfumery or care. In this case, the non-deformable reservoir 22 is formed by a tubular body 24, here rotationally symmetric, extending around an axis X defining a longitudinal direction. A radial direction is a direction perpendicular to the longitudinal direction X and intersecting this direction. Similarly, an axial plane is a plane containing the X axis of the reservoir 22 and a radial plane is a plain perpendicular to this axis.

In the present disclosure, the terms upper, lower, high and low are to be understood in a relative sense only, with reference to the figures. They make it possible to distinguish two essentially opposite locations. In particular, the straight line connecting a "high" point to a "low" point, in this case the longitudinal direction X, is not necessarily vertical in the usual sense of the term.

The body 24 may be made of any material compatible with the intended liquid or pasty product, for example of plastic material such as a deformable or non-deformable thermoplastic, glass, metal or any other material known to a person skilled in the art. In this embodiment, the body 24 is manufactured from a transparent material. In this case, the body 24 is produced by injection, which makes it easy to create desired reliefs, in particular, as will be seen below, an attachment part 26 for a dispensing member 28.

The daughter bottle 20 may comprise a masking cover 30 taking the form of an opaque cylinder, made of aluminium for example. The masking cover 30 is configured to fit over the body 24 in order to mask the interior. However, the masking cover 30 may be hollowed out in places, for example in order to form a window 32 which makes it possible to see, through the transparent body 24, the level of product remaining in the reservoir 22. For a better estimation of this level, the window 32 may be elongated in the direction of gravity in normal use of the device, in other words here in the longitudinal direction X. Hence, in this embodiment, the for example oblong-shaped window 32 extends over more than half of the masking cover 30 in the longitudinal direction X. In this way, the wall of the reservoir 22 has at least one transparent window 32. In other embodiments, the window 32 could be translucent, either due to the material of the body 24 or due to an additional material provided in the hollow of the masking cover 30.

At one end, here its upper end, the body 24 is closed by a dispensing member 28. In this case, the dispensing member 28 comprises a pump 28*a* the details of which, being known to a person skilled in the art, are not illustrated. The pump 28*a* can be associated with a dip tube 28*b*, here a flexible dip tube, extending to the opposite end of the reservoir 22.

The dispensing member 28 can be assembled on the body 24 by any suitable means, preferably sealed. In this case, a collar 28*c* is provided to engage with the above-mentioned attachment part 26, in this case by snap-fastening, the attachment part 26 being able to form a radial recess configured to receive a radial protrusion of the collar 28*c*.

The dispensing member 28 can be actuated in order to deliver the product from the daughter bottle, in a manner known per se, by an axial pressure (in other words in the longitudinal direction X) on the dispensing head 28*d* of the pump 28*a*. Typically, the pump 28*a* then sucks up the product contained in the reservoir 22, via the dip tube 28*b*, and delivers it via the dispensing head 28*d*.

The daughter bottle 20 may comprise a decorative collar ring 48, for example in order to mask the securing of the dispensing member 28 on the body 24. The collar ring 48 may be metallic. The collar ring can be assembled to the remainder of the daughter bottle, for example to the collar 28*c*, by means known per se, for example by clamping. In addition, as is clear from FIG. 2, the collar ring 48 can interact, here through external protrusions 48*a*, with a cap 80 of the dispensing device 10, which will be described below. The protrusions 48*a* can also be used to hold a travelling cap for closing the sole daughter bottle 20.

As indicated above, the daughter bottle 20 further comprises the daughter portion of a refill mechanism comprising a daughter portion and a mother portion. The mother portion of the refill mechanism will be described subsequently. In this case, the daughter portion of the refill mechanism (or more simply "daughter portion") is provided, on the daughter bottle 20, opposite the dispensing member 28. In this embodiment, the daughter portion closes the lower end of the body 24.

The daughter portion of the refill mechanism comprises a bottom 34 defining an orifice 36. The bottom 34 can be assembled on the body 24 by any suitable means, preferably sealed. In this case, the bottom 34 comprises a peripheral skirt 34*a*, the radially outer surface of which defines bosses 34*b*, here circumferential, intended to ensure clamping against the radially inner surface of the body 24 and, consequently, to guarantee both the holding and the sealing of the connection between the bottom 34 and the body 24.

The bottom 34 further comprises a base 34*c* closing the interior of the skirt 34*a*. In this embodiment, the base 34*c* has a shape that is flared towards the end of the body 24, which has the following double effect: on the one hand, inside the reservoir 22, in the lower portion of the reservoir 22, the cross-sectional area is locally reduced in order to concentrate the remaining product; on the other hand, on the outside of the reservoir 22, the flared shape is suitable for receiving the mother portion of the refill mechanism, which will be described below.

In this case, the base 34*c* has a staircase shape, formed from a plurality of successive radial plates, here coaxial and longitudinally offset with respect to one another, connected by tubular sections. Instead of a staircase shape, the flared shape of the base 34*c* could be generally frustoconical, pyramid-like, etc.

The bottom 34 may be formed as a single piece, the skirt 34*a*, the bosses 64*b* and the base 34*c* being made in one piece. For example, the bottom 34 can be made of plastic, for example polyethylene.

The orifice 36 is provided in the base 34*c*, in this case in its centre. As indicated above, the daughter portion of the refill mechanism may comprise a sealing valve, such as a non-return valve, in order to limit leaks via the orifice 36. In this case, the non-return valve is formed by a ball 38, held against the orifice 36 by a spring 40 mounted in compression between the ball 38, and a pierced cap 42, assembled on the base 34*c* and forming a support for the spring 40.

The mother bottle 60 comprises a reservoir 62 for receiving a liquid or pasty product, in particular the same product as the reservoir 22 of the daughter bottle. In this case, the non-deformable reservoir 62 is formed by a tubular body 64, here with a polygonal base, the body 64 being closed at its lower end. The longitudinal direction of the body 64 coincides with the longitudinal direction of the daughter bottle 20 when the mother bottle 60 and the daughter bottle 20 are assembled as described in the following, this is why a single longitudinal direction X is referred to below, for conciseness.

The body 64 can be made of any material compatible with the intended liquid or pasty product, for example glass. More generally, the body 64 can be manufactured from a transparent material. In this case, the body 64 is produced by pressing, which makes it possible to precisely control its internal shape.

The body 64 can be at least partially closed, at its open end (upper end), by a lid 66 having an opening 66*a*. The lid 66 can also be produced, for example, from pressed glass, plastic, metal, etc., optionally from the same material as the body 64. The lid 66 may be produced separately from the body 64 due to manufacturing constraints, but is then assembled on the body 64 in a manner known per se, for example by screwing, bonding, welding, clipping, interlocking or any other method of assembly that can be envisaged by a person skilled in the art. According to an alternative using another method of manufacture, the body 64 and the lid 66 can be formed simultaneously, as a single piece.

The lid 66 supports a sheath 68 intended to form a recess 70 for the daughter bottle 20. The sheath 68 can have any internal shape corresponding to the external shape of the daughter bottle, in this case a shape mainly extending along the longitudinal direction X and substantially rotationally symmetric about the longitudinal direction X. As illustrated in FIG. 2, the sheath 68 can be sufficiently long to receive at least 50% of the volume of the daughter bottle 20, in this case almost the entirety of the daughter bottle 20, with the exception of the dispensing member 28 or at least the elements necessary for its actuation, namely here the dispensing head 28*d*.

The sheath 68 can be supported by the lid 66 by any means that can be envisaged by the person skilled in the art. As can be seen from FIG. 2 in particular, the sheath 68 is here assembled to the lid 66 by snap-fastening, in a manner similar to the assembling of the dispensing member 28 on the body 24, described above. The sheath 68 can be made of a material chosen by a person skilled in the art according to his knowledge. In this case, in order to facilitate the snap-fastening, in particular when the lid 66 is made of glass, the sheath 68 can be made of a plastic material such as an ionomer (such as Surlyn [registered trademark]), polyethylene terephthalate (PET), a polyolefin, etc. Alternatively, the sheath 68 can be made from any other material that can be envisaged by a person skilled in the art, for example wood or metal.

The sheath 68 can be open at its upper end in order to allow the insertion and withdrawal of the daughter bottle 20 in the recess 70. Hence, through the sheath 68, in this embodiment the mother bottle 60 defines a recess 70 for removably receiving the daughter bottle 20. Optionally, on its radially inner face, the sheath 68 may comprise ribs 68*a*, for example longitudinal ribs, intended to come into contact with the outside of the daughter bottle 20 in order to improve the stability of the daughter bottle 20 in the recess 70. In addition, the sheath 68, or more generally the recess 70, may be supplemented by a centring ring 74, here located at the inlet of the recess 70. The centring ring 74 may, for example by means of resilient tabs 74*a*, project towards the recess 70, making the positioning of the daughter bottle 20 in the recess 70 still more reliable.

At its lower end, the sheath 68 may be closed by a bottom 68*b*, here a transverse bottom, supporting a mother portion of the refill mechanism. Hence, the mother bottle 60 is equipped with a mother portion of the refill mechanism.

More particularly, in this embodiment, the mother portion of the refill mechanism comprises a pump 72. The pump 72 may be assembled on the bottom 68*b* of the sheath 68 by any means that can be envisaged by a person skilled in the art, for example by snap-fastening. The pump 72, or more generally the mother portion of the refill mechanism, forms an interface between the inside of the reservoir 62, defined in a sealed manner between the body 64 of the mother bottle 60, the lid 66 and the sheath 68, and the outside of the reservoir 62.

Furthermore, the mother bottle 60 may comprise a cover 76 around the refill mechanism. In this embodiment, the cover 76 is a separate part from the sheath 68, of tubular shape corresponding to that of the sheath 68 and force-fitted on the sheath 68, where it can be retained by ribs 68*c*, here longitudinal ribs, provided on the radially outer face of the sheath 68. Alternatively, the cover 76 and the sheath 68 could be assembled to one another, or even formed as a single part. However, two separate parts, as illustrated, have the advantage of facilitating manufacture and enabling different materials to be used; in this case, the cover 76 may be made of metal, in particular for aesthetic reasons. Other materials, opaque or otherwise, can be envisaged. Furthermore, the presence of ribs 68*c* creates a space between the sheath 68 and the cover 76. This space avoids the trapping of residual air, which would be located between the bottom 68*b* and the lower end of the cover 76, during the introduction of the daughter bottle 20 into the recess 70. Indeed, such a trapping could cause an overflow of product from the mother bottle 60.

FIG. 2 shows that the cover 76 is located inside the reservoir 62 of the mother bottle and that, furthermore, the cover 76 extends, on the side of the pump 72, beyond the sheath 68. More precisely, the cover 76 extends longitudinally here beyond the pump 72. Hence, the cover 76, located radially outside the sheath 68, masks from view the mother portion of the refill mechanism, namely the pump 76, but also, as is seen in FIG. 2, the inside of the sheath 68, thus the daughter portion received in the recess 70. In this, the mother bottle 60 comprises a cover 76 around the refill mechanism.

The mother bottle 60 may comprise a decorative collar ring 78, for example for masking the securing of the lid 66, the sheath 68 and/or the centring ring 74. The collar ring 78 may be metallic. The collar ring can be assembled to the remainder of the mother bottle, for example to the lid 66, by means known per se, for example by clamping. In addition, as is clear from FIG. 2, the collar ring 78 may interact, here through external protrusions 78*a*, with a cap 80 so as to hold it assembled to the mother bottle 60.

As was previously seen, the daughter bottle 20 is autonomous with regard to its dispensing, the dispensing member 28 enabling the product contained in the reservoir 22 to be delivered. However, when the user is not travelling or when it is desired to refill the daughter bottle 20, the daughter bottle 20 can be inserted in the recess 70 of the mother bottle 60, thus obtaining the configuration illustrated in FIG. 2.

In this configuration, the daughter bottle 20 is received in the recess 70 and the daughter portion of the refill mechanism is coupled to the mother portion of the refill mechanism, by which the refill mechanism is formed and made operational. In this case, the outlet 72*a* of the pump 72 engages in the orifice 36 of the daughter portion of the refill mechanism, which defines a continuous channel from the reservoir 62 of the mother bottle 60 to the reservoir 22 of the daughter bottle 20, via the pump 72 and its outlet 72*a*, the orifice 36, the non-return valve comprising the ball 38, the spring 40 and the pierced cap 42. Hence, the refill mechanism is capable of refilling the daughter bottle 20 with product from the mother bottle 60.

The shoulders formed by the staircase-shaped base 34*c*, or more generally a wall of the daughter bottle 20, can be supported on an actuating portion of the refill mechanism, in this case an actuating portion of the pump 72, as illustrated in FIG. 2. In addition to its ability to transmit and actuating force, this support forms a sealing means between the mother portion and the daughter portion.

When the user wishes to dispense the product, the cap 80 being withdrawn, he can exert a longitudinal pressure on the dispensing head 28*d*. He feels, in return, a resistance linked, on the one hand, to the actuating threshold of the dispensing member 28 and, on the other hand, to the actuating threshold of the pump 72. Insofar as the force required for actuating the dispensing member 28 is greater than or equal to the force required for actuating the refill mechanism, the pressure from the user first overcomes the resistance of the refill mechanism, and first causes a longitudinal movement in translation of the entire daughter bottle 20 downwards in the orientation of FIG. 2. This movement in translation causes, by interaction of the base 34*c* and the pump 72, the actuating of the pump 72 and, subsequently, the transfer of product from the reservoir 62 of the mother bottle 60 to the reservoir 22 of the daughter bottle 20, the pressure of the product coming from the mother bottle 60 being sufficient for opening the non-return valve, in other words moving the ball 38 against the spring 40. Hence, the actuating force of the dispensing member 28 (here the pressure from the user) is transmitted, via the movement of the daughter bottle 20 in the recess 70, in order to actuate the refill mechanism.

The calibrating of the actuating force of the dispensing member 28 and of the refill mechanism can, in this case, be carried out by dimensioning the stiffness of the respective springs, or any other equivalent element, of the pump 28*a* and of the pump 72. Typically, if the pump 72 of the refill mechanism and the pump 28*a* of the dispensing member 28 are furthermore identical, the stiffness of the spring of the pump 28*a* of the dispensing member 28 will be greater than or equal to the stiffness of the spring of the pump 72 of the refill mechanism.

If the user continues to exert a pressure, the daughter bottle 20 arrives at the bottom of the recess 70 and/or at the end of travel of the pump 72. As a result, the pressure exerted by the user then exceeds the resistance of the dispensing member 28, and finishes by actuating the dispensing member 28.

This embodiment therefore forms an example of a method for distributing liquid or pasty product, in particular cosmetic product, comprising:

- supplying a dispensing device 10 comprising a daughter bottle 20, a mother bottle 60 and a refill mechanism, wherein the daughter bottle 20 is equipped with a dispensing member 28 and a daughter portion of the refill mechanism, and the mother bottle 60 is equipped with a mother portion of the refill mechanism;
- introducing the daughter bottle 20 into a recess 70 of the mother bottle so as to couple said daughter portion to said mother portion, the refill mechanism then being able to refill the daughter bottle 20 with product from the mother bottle 60;
- actuating the refill mechanism and the dispensing member 28 by a same actuating force applied to the dispensing member 28 and transmitted to the refill mechanism.

As previously indicated, the refill mechanism and the dispensing member 28 can be dimensioned so that the volume of product injected into the daughter bottle 20 by the refill mechanism in one actuation is less than, greater than, or preferably equal to the volume of product dispensed by the dispensing member 28 in one actuation. To achieve this, for example, the capacity of the pump 72 can be respectively less than, greater than or equal to the capacity of the pump 28*a*.

According to another possible use, for refilling the daughter bottle 20 without dispensing product, the user can exert a pressure not on the dispensing head 28*d* but on the body 24 of the daughter bottle 20, for example via the collar 28*c* or the collar ring 48 of the daughter bottle 20. For example, a removable cap can be provided, typically serving as protection for the dispensing member 28 during mobile use of the daughter bottle, making it possible to press on the daughter bottle, for example on the collar 28*c*, without actuating the dispensing member 28.

This other use thus forms an example of a method for refilling a daughter bottle 20 with a liquid or pasty product, in particular with cosmetic product, wherein the daughter bottle 20 is equipped with a dispensing member 28 and a daughter portion of a refill mechanism, the refilling method comprising:

- introducing the daughter bottle 20 into a recess 70 of a mother bottle 60 equipped with a mother portion of the refill mechanism, so as to couple said daughter portion to said mother portion, the refill mechanism then being suitable for refilling the daughter bottle 20 with product from the mother bottle 60;

actuating the refill mechanism by an actuating force applied to a portion of the daughter bottle 20 different from the dispensing member 28.

Alternatively again, in particular if the actuating thresholds of the dispensing member 28 and of the refill mechanism are sufficiently far apart from one another, the user can exert, on the dispensing head 28*d*, a limited pressure which is sufficient to actuate the refill mechanism, and stop exerting this pressure when the daughter bottle 20 comes to a stop; hence, the user releases the pressure from the dispensing head 28*d* before this pressure is sufficient to actuate the dispensing member 28.

Although the present description refers to specific exemplary embodiments, modifications can be applied to these examples without going beyond the general scope of the invention as defined by the claims. In addition, the individual features of different embodiments illustrated or mentioned can be combined in additional embodiments. Consequently, the description and the drawings should be considered as illustrating rather than limiting.

The invention claimed is:

1. A dispensing device for dispensing a liquid or pasty product, comprising a daughter bottle, a mother bottle and a refill mechanism, wherein the daughter bottle is equipped with a dispensing member and a daughter portion of the refill mechanism, the mother bottle is equipped with a mother portion of the refill mechanism and defines a recess for removably receiving the daughter bottle, said daughter portion being configured to couple to said mother portion when the daughter bottle is received in the recess, the refill mechanism then being able to refill the daughter bottle with product from the mother bottle, the dispensing device being configured to transmit an actuation force of the dispensing member in order to actuate the refill mechanism, a force required for actuating the dispensing member being greater than or equal to a force required for actuating the refill mechanism, and wherein the dispensing member is configured to dispense product from the daughter bottle under action of pressure from a user, and when the daughter bottle is received in the recess, the refill mechanism is designed to actuate in response to the movement of the daughter bottle in the recess under effect of said pressure.

2. The dispensing device according to claim 1, wherein the mother portion of the refill mechanism comprises a pump, an outlet of which is configured to engage in an orifice of the daughter portion of the refill mechanism.

3. The dispensing device according to claim 1, wherein when the daughter bottle is received in the recess, a wall of the daughter bottle bears on an actuating portion of the refill mechanism.

4. The dispensing device according to claim 1, wherein the daughter portion of the refill mechanism comprises a sealing valve.

5. The dispensing device according to claim 1, wherein the refill mechanism and the dispensing member are dimensioned so that a volume of product injected into the daughter bottle by the refill mechanism in one actuation is less than or equal to a volume of product dispensed by the dispensing member in one actuation.

6. The dispensing device according to claim 1, wherein the daughter portion of the refill mechanism is provided, on the daughter bottle, opposite the dispensing member.

7. The dispensing device according to claim 1, wherein the daughter bottle comprises a reservoir intended to receive the product, said reservoir being non-deformable.

8. The dispensing device according to claim 1, wherein the mother bottle comprises a cover around the refill mechanism.

9. The dispensing device according to claim 1, wherein the daughter bottle comprises a reservoir for receiving the product, a wall of the reservoir having at least one transparent or translucent window.

10. A method for distributing liquid or pasty product, comprising:

supplying a dispensing device comprising a daughter bottle, a mother bottle and a refill mechanism, wherein the daughter bottle is equipped with a dispensing member for delivering the product from the daughter bottle under action of pressure from a user and a daughter portion of the refill mechanism, and the mother bottle is equipped with a mother portion of the refill mechanism;

introducing the daughter bottle into a recess of the mother bottle so as to couple said daughter portion to said mother portion, the refill mechanism then being able to refill the daughter bottle with product from the mother bottle;

actuating the refill mechanism and the dispensing member by a same actuating force applied to the dispensing member and transmitted to the refill mechanism, when the daughter bottle is received in the recess, the actuation of the refill mechanism taking place in response to a movement of the daughter bottle in the recess under the effect of said pressure.

11. A method for refilling a daughter bottle with liquid or pasty product, wherein the daughter bottle is equipped with a dispensing member and a daughter portion of a refill mechanism, wherein the dispensing member is configured to dispense product from the daughter bottle under action of a pressure from a user, the refill method comprising:

introducing the daughter bottle into a recess of a mother bottle equipped with a mother portion of the refill mechanism, so as to couple said daughter portion to said mother portion, the refill mechanism then being suitable for refilling the daughter bottle with product from the mother bottle, and when the daughter bottle is received in the recess, the refill mechanism is designed to actuate in response to movement of the daughter bottle in the recess under the effect of said pressure;

actuating the refill mechanism by an actuating force applied to a portion of the daughter bottle different from the dispensing member.

12. The method for refilling according to claim 11, wherein the actuating force is applied to a cap of the daughter bottle.

* * * * *